United States Patent [19]

Beck, Jr.

[11] 4,250,587
[45] Feb. 17, 1981

[54] SCRUBBING DEVICE

[76] Inventor: John W. Beck, Jr., Country Club Rd., Morehead City, N.C. 28557

[21] Appl. No.: 53,741

[22] Filed: Jul. 2, 1979

[51] Int. Cl.³ .......................... A46B 13/02; F16D 7/00
[52] U.S. Cl. ..................................... 15/28; 51/170 T; 64/30 A
[58] Field of Search ............... 15/23, 24, 28, 29, 97 R, 15/93 R; 51/170 PT, 170 T; 64/30 R, 30 A, 30 C

[56] References Cited

U.S. PATENT DOCUMENTS

| 1,138,926 | 5/1915 | Bernett | 64/30 R |
| 1,400,079 | 12/1921 | Kolling | 64/30 A |
| 2,170,036 | 8/1939 | Schumann | 15/28 X |
| 2,606,431 | 8/1952 | Elgin | 64/30 R |
| 2,904,804 | 9/1959 | Odessey | 15/23 X |
| 2,944,271 | 7/1960 | Foster | 15/28 |
| 3,932,908 | 1/1976 | Bitgood et al. | 15/28 |
| 4,131,966 | 1/1979 | Gross | 15/28 |

FOREIGN PATENT DOCUMENTS 48011  1/1917  Sweden .................. 64/30 A

Primary Examiner—Edward L. Roberts
Attorney, Agent, or Firm—Mills & Coats

[57] ABSTRACT

This invention is a scrubbing device particularly adapted for use in cleaning shower stalls, bathroom tile, tubs and the like. The drive motor of the unit is of the variable speed type and through a nonconductive clutch drive and associated drive cable operates a hand-held scrubber head. The prevention of accidental electric shock is assured through use of nonconductive material in the power transfer portion of the invention as well as the exterior housings thereof.

7 Claims, 5 Drawing Figures

SCRUBBING DEVICE

FIELD OF INVENTION

This invention relates to cleaning means and more particularly to an improved scrubbing device particularly adapted for use in conjunction with bathroom type tubs, tiles and stalls.

BACKGROUND OF INVENTION

Since man first began placing indoor plumbing in houses, problems have been encountered in maintaining such areas since they remain damp much of the time. Shower stalls, bathtubs and adjacent tile and similar splash surfaces are particularly susceptible to the rapid growth of mold and mildew as well as build-ups of surface scum caused by soap residue, dirt and the like.

Over the years stiff bristle brushes used with bleach containing cleansers and a lot of arm power have been found to be the most expedient means for cleaning surfaces of the type enumerated. In recent times, some attempts have been made to mechanize this type of cleaning project. These devices invariably have been heavy, bulky systems which are difficult to manipulate and quite often, when working around water or in damp areas, can be extremely dangerous due to the possibility of electrical shock. Also the getting out and putting up such equipment is laborious in and of itself and greatly detracts from its utility.

To summarize the cleaning of bathroom type shower stalls, tubs, tiles and other like areas is a difficult and laborious job for which an adequate solution until now has not been found.

SUMMARY OF INVENTION

After much research and study into the above-mentioned problems, the present invention has been developed to provide a mechanical scrubbing device which is simple to use, is easy to manipulate and can be so located and mounted as to be readily available at all times. The device will do a much better cleaning job than hand scrubbing with a lot less effort being required than was heretofore necessary in using either prior known mechanical or hand manipulated devices. This result is accomplished while including positive shock prevention means as well as means for preventing damage to the system due to stop motion through use of a unique adjustable drag type safety clutch mechanism.

In view of the above, it is an object of the present invention to provide a scrubbing device which is easily manipulated and yet highly efficient in operation.

Another object of the present invention is to provide a tub, tile and stall scrubbing device with a variable speed drive means.

Another object of the present invention is to provide a device for scrubbing bath surfaces which is wall mounted during operation.

Another object of the present invention is to provide, in a wall mounted scrubbing means, an improved nonelectrically conductive safety clutch means.

Another object of the present invention is to provide, in a scrubbing device, a safety clutch which is tension settable for various cleaning requirements.

Another object of the present invention is to provide, in an electrically driven scrubbing means, means for positively preventing electrical shock to the user thereof.

Other objects and advantages of the present invention will become apparent and obvious from a study of the following description of the accompanying drawings which are merely illustrative of such invention.

DETAILED DESCRIPTION OF PREFERRED EMBODIMENT

Figure 1:
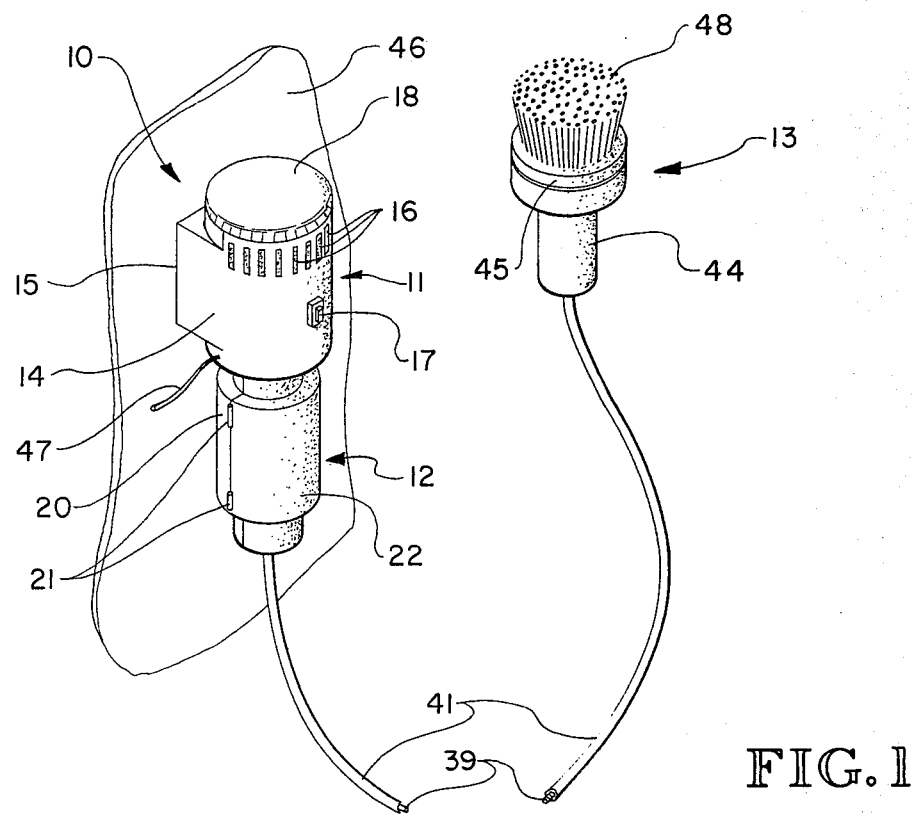
FIG. 1 is a perspective view of the scrubbing device of the present invention showing the same in wall mounted position.
Figure 2:
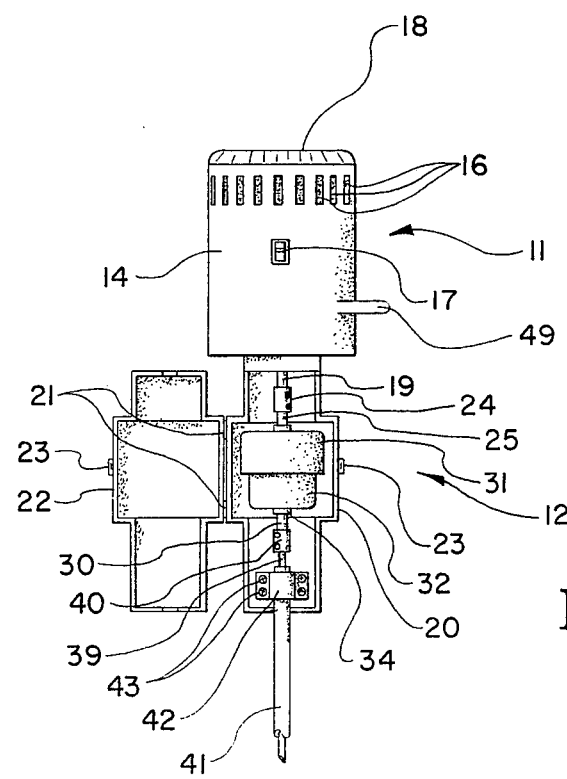
FIG. 2 is a front elevational view thereof with the clutch cover open.
Figure 3:
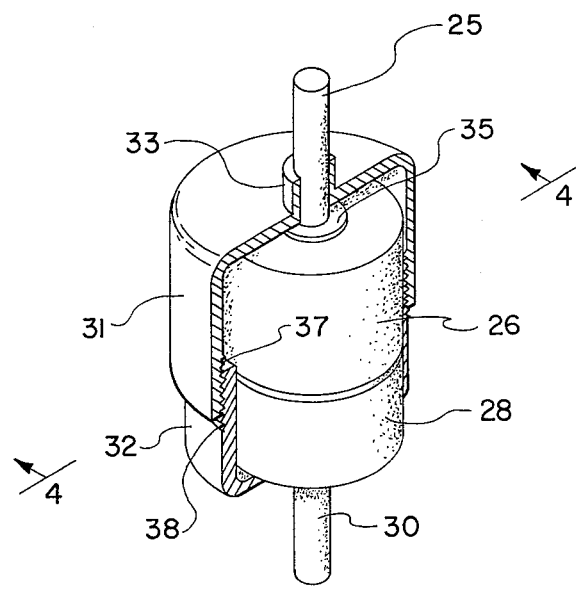
FIG. 3 is a partially cutaway perspective view of the clutch mechanism of the present invention.
Figure 4:
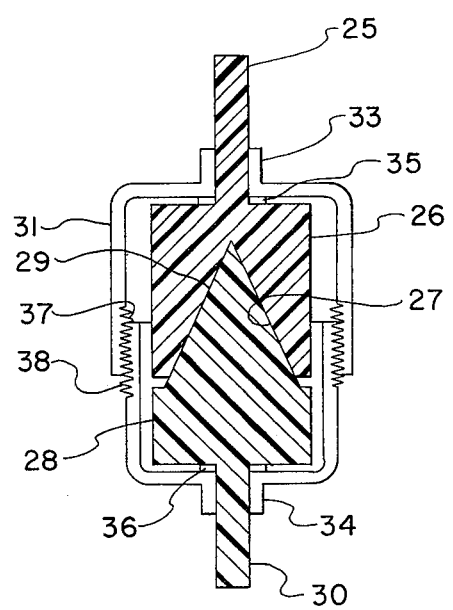
FIG. 4 is a sectional view taken through lines 4—4 of FIG. 3.
Figure 5:
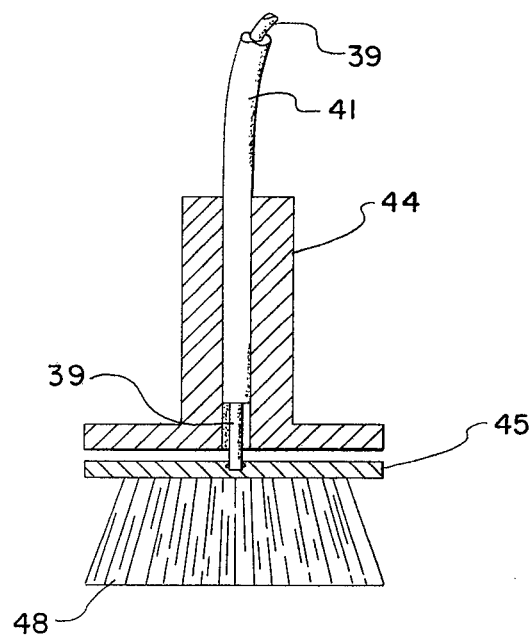
FIG. 5 is a sectional view of the scrubber head.

With further reference to the drawings, the scrubbing device of the present invention, indicated generally at 10, includes a motor portion, a clutch portion, and a scrubber portion indicated generally at 11, 12 and 13, respectively.

The motor portion 11 includes a motor contained within motor housing 14. This housing preferably includes a generally flat rear portion 15 for mounting on a wall or other suitable surface 46. This mounting means can be either permanent or removable as desired. Means of this type are well known to those skilled in the art and further description of the same is not deemed necessary.

A plurality of openings 16 are provided in housing 14 to allow for adequate cooling of the motor built thereinto. A standard off-on switch 17 is provided in the front portion of housing 14 and operates in the normal manner of such devices. Also a rheostat type control knob 18 is provided which allows for variable speed control of the drive output shaft 19 of the motor. Since the internal structure of rheostat controlled, variable speed motors are well known to those skilled in the art, further detail discussion of the same is not deemed necessary.

Fixedly secured to and depending from the lower portion of motor housing 14 is a clutch case 20. This case is preferably formed from a non-electrical conducting material as is motor housing 14.

Pivotably connected to case 20 by means such as hinges 21 is an openable closure 22. A snap latch 23 is provided on case 20 and closure 22 to allow releasable retention between the two parts when in the closed position.

Motor drive shaft 19 is connected through coupling 24 to clutch input shaft 25. This shaft is formed preferably as a unitary member of cylindrical clutch block 26 which has a concave conical shaped opening 27 in the bottom thereof (as oriented in the drawings), said conical opening being in axial alignment with the input shaft 25.

An output clutch block 28 is provided which includes a conical shaped portion 29 of mating dimensions to opening 27 and in axial alignment with clutch output shaft 30.

Cooperatively encasing clutch blocks 26 and 28 are upper and lower (as oriented in the drawings) clutch housings 31 and 32, respectively. An integral bearing collar 33 is provided in housing 31 and is similar to bearing collar 34 provided in housing 32.

Mounted on shafts 25 and 30 between and juxtaposed to respective adjacent clutch blocks 26 and 28, and bearing collars 33 and 34, are bearing washers 35 and 36, respectively. These washers are, of course, formed from a material having a low friction co-efficient.

The upper housing 31 is interiorly threaded at 37 and the lower housing 32 is exteriorly threaded at 38. Thus the two housings can be threadingly mated and telescopingly adjusted axially by twisting one housing relative to the other. It can, therefore, be seen that as the two clutch housings are inwardly telescoped, progressively greater binding pressure will be placed on clutch block surfaces 27 and 29 thus increasing the drive connection therebetween. Conversely, loosening of housing 31 relative to housing 32 progressively reduces the binding pressure on such surfaces and allows slippage between the two clutch blocks at a lower torque.

Since the purpose of threadingly connecting clutch housings 31 and 32 is to control the torque setting at which slippage between the two clutch blocks will occur, these housings do not need to be mounted on any fixed support, but to the contrary are free to rotate with the two frictionally connected clutch blocks 26 and 28. When slippage between the two blocks does occur, the bearing washers 35 and 36 will allow such slippage to occur without distributing the relative connection between clutch housings 31 and 32. In other words, relative slippage between the clutch blocks will not affect the preset threaded connection between the clutch housings.

Clutch output shaft 30 is operatively connected to drive cable 39 by coupling 40. A drive cable sheath or housing 41 is provided in the normal manner and is fixedly secured at one end to clutch case 20 by means such as bracket 42 and its associated screw type retainers 43. Drive cables and the flexible housing within which they are rotatively mounted are well known to those skilled in the art and further discussion of the details of such drive means is not deemed necessary. The only further comment deemed necessary relative thereto is that the cable sheath or housing 41 is preferably formed from a nonelectrically conductive material as are the clutch blocks 26 and 28 and the clutch housings 31 and 32.

To the end of drive cable 39 opposite clutch coupling 40 is operatively mounted the scrubber portion 13 of the present invention. The cable housing 41 is fixedly secured to scrubber housing 44 which is preferably of a convenient shape and size to fit the hand of the user (not shown) of the present invention.

The drive cable 39 rotatively mounted within cable housing 41 is fixedly secured to rotatable scrub brush 45. Although the connection between drive cable 39 and scrub brush 45 is indicated as being fixed, it is understood that they are fixed meaning one can drive the other but the scrub brush or head itself can be removably connected to the cable so that such brush or head can be changed as deemed or desirable. Connections of this type are, of course, well known to those skilled in the art.

To use the scrubbing device of the present invention, the motor housing 14 is mounted on a convenient wall or other surface 46 and line cord 47 operatively connected to a suitable source of power (not shown).

The scrubbing device 10 is then turned on by switch 17 and the rotative speed of motor 14 adjusted by control 18 as desired. The scrubber head 13 can then be removed from the bracket 49 disposed on the side of motor 14 and the handle shaped scrubber housing 44 grasped for manipulation of the same during the scrubbing process.

Any desired surface within the reach of the elongated drive cable 39 can now be scrubbed using whatever cleansers, detergents, water or other material desired. Because of the lightweightness and yet high efficiency of the scrubber head or portion 13, an easily maneuverable, highly efficient scrubbing device is provided with little effort being required on the part of the operator to accomplish the desired end result.

Once the scrubbing process has been completed, either the scrubber portion 13 can be replaced on bracket 49 until needed again or the entire scrubbing device 10 can be removed from wall 46 and stored until again needed.

The present invention can be either permanently or removably mounted on a wall or other supporting surface. Also bracket 49 can either be attached to motor housing 14 as indicated or can, of course, be located separate therefrom.

From the above, it is obvious that the present invention has the advantage of providing and inexpensive to manufacture and yet highly efficient scrubbing device which can be permanently or removably mounted, has interchangeable scrubber heads, is lightweight and highly manipulatible and yet is extremely efficient in the results accomplished.

The terms "upper", "lower", "back", etc., have been used herein merely for convenience to describe the scrubbing device and its parts as oriented in the drawings. It is to be understood, however, that these terms are in no way limiting to the invention since the device may obviously be disposed in different orientations when in use.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended Claims are intended to be embraced therein.

What is claimed is:

1. In a scrubbing means including a motor means, a flexible drive cable means, a clutch means operatively interposed between said motor means and one end of said cable means, and scouring means operatively mounted on the end of said cable means opposite clutch block means operatively connected to said motor means; a second clutch block means disposed in axial alignment with and juxtaposed to said first block means and operatively connected to said drive cable means; and an enclosing two piece clutch housing threadingly telescoped together and rotatively disposed about and in axial contact with said first and second clutch blocks whereby a torque control means is provided which is adjustable by tightening or loosening the threaded relationship between the clutch housings which in turn increases or decreases the binding contact between said first and said second clutch blocks.

2. The scrubbing means of claim 1 wherein one of said clutch blocks includes a generally conical shaped depression in its juxtaposed surface to the other block which includes a mating, generally conical shaped projection whereby greater contact surface area between said blocks is achieved.

3. The scrubbing means of claim 1 wherein bearing means are provided between each of said blocks and their adjacent housing.

4. The scrubbing means of claim 3 wherein said bearing means are washer shaped.

5. The scrubbing means of claim 1 wherein the motor means is electrically driven.

6. The scrubbing means of claim 5 wherein said motor is of the variable speed type.

7. The scrubbing means of claim 1 wherein said clutch means and all of its parts are constructed from a nonelectrically conductive material.

* * * * *